United States Patent [19]

Hirayama et al.

[11] Patent Number: 5,548,057
[45] Date of Patent: Aug. 20, 1996

[54] ONE-COMPONENT-TYPE COMPOSITION FOR POLYURETHANE ELASTOMER AND METHOD FOR PROCESSING THE SAME BY MOLDING

[75] Inventors: Shinji Hirayama, Hadano; Shin Konishi, Fujisawa; Takao Hidai, Anjo; Shinjiro Hama, Fujisawa; Sadako Hashimoto, Hadano; Yukihiro Morikawa, Yokohama, all of Japan

[73] Assignees: Inoac Corporation; Nippon Polyurethane Industry Co., Ltd., both of Japan

[21] Appl. No.: 294,835

[22] Filed: Aug. 29, 1994

[30] Foreign Application Priority Data

Aug. 31, 1993 [JP] Japan .................... 5-240581

[51] Int. Cl.$^6$ ........................... C08L 75/04
[52] U.S. Cl. ................................. 528/67
[58] Field of Search ........................... 528/67

[56] References Cited

U.S. PATENT DOCUMENTS

| | | | |
|---|---|---|---|
| 4,442,280 | 4/1984 | Grögler et al. | 528/73 |
| 4,463,154 | 7/1984 | Disteldorf et al. | 528/45 |
| 4,668,780 | 5/1987 | Disteldorf et al. | 540/202 |
| 5,143,994 | 9/1992 | Laas et al. | 528/67 |
| 5,237,058 | 8/1993 | Laas et al. | 528/67 |

FOREIGN PATENT DOCUMENTS

| | | |
|---|---|---|
| 1153900 | 9/1963 | Germany . |
| 58-37022 | 3/1983 | Japan . |
| 1-50265 | 10/1989 | Japan . |
| 2-16332 | 4/1990 | Japan . |

*Primary Examiner*—Thomas Hamilton, III
*Attorney, Agent, or Firm*—Finnegan, Henderson, Farabow, Garrett, & Dunner, L.L.P.

[57] ABSTRACT

A one-component-type composition for a polyurethane elastomer, comprising as a main component a polyurethane precursor containing a polyisocyanate component, and a compound having active hydrogen groups. The polyisocyanate component contains a polyisocyanate having at least a urethodione group (particularly urethodione and isocyanurate groups), and the compound (polyol or the like) having active hydrogen groups contains at least two active hydrogen groups in its molecule and has a molecular weight of 18 to 20000. The polyurethane precursor is obtained by reacting the polyisocyanate component and the compound having active hydrogen groups under the condition that the equivalent ratio of the active hydrogen group in the compound having active hydrogen groups to the isocyanate group in the polyisocyanate component exceeds 1.0. The equivalent ratio of the urethodione group to the active hydrogen group in the polyurethane precursor is from 0.25 to 1.0. The one-component-type composition for a polyurethane elastomer has storage stability comparable to that of thermoplastic elastomers, can be handled with ease, and does not pollute working environment. The composition is useful for preparaing elastomers which have physical properties equal to those of two-component-type elastomers.

21 Claims, No Drawings

ONE-COMPONENT-TYPE COMPOSITION FOR POLYURETHANE ELASTOMER AND METHOD FOR PROCESSING THE SAME BY MOLDING

BACKGROUND OF THE INVENTION i) Field of the Invention

The present invention relates to a one-component-type composition for a polyurethane elastomer and a method for processing the same by molding. More particularly, the present invention relates to a one-component-type composition for a polyurethane elastomer which comprises as a main component a polyurethane precursor containing urethodione groups and active hydrogen groups in a specific ratio, shows excellent storage stability under ordinary environmental conditions, is cured when simply heated due to elongation and crosslinking of chains, produces no free polyisocyanate monomer during handling, has excellent handling properties, and is highly safe; and a method for processing the same by molding.

ii) Description of the Related Art

Polyurethane elastomers are excel lent in various properties such as rubber elasticity, chemical resistance, abrasion resistance, toughness, cold resistance and durability. They are therefore utilized particularly in recent years as paints, floor covering materials, water proof materials, adhesives, wall covering materials and sealing materials. Polyurethane elastomers are divided broadly into thermoplastic elastomers and thermosetting elastomers.

Thermoplastic elastomers (TPU) are linear polyurethanes having a high molecular weight, and can be processed by ordinary techniques for processing thermoplastic resins, such as injection molding or extrusion molding. On the other hand, thermosetting elastomers are classified into the following two types:

(1) Two-component type in which polyisocyanate and/or an isocyanate-terminated prepolymer and a polyol are mixed with stirring just before the use, and the mixture is then injected into a mold and cured; and (2) One-component-moisture-curing type in which an isocyanate-terminated propolymer is cured by allowing it to react with moisture in the air.

These elastomers have both merits and demerits. The thermoplastic elastomers are linear polyurethanes having a high molecular weight, and have semipermanent storage stability and good working properties. However, their softening points are low because they do not have a crosslinked structure. This brings about a drawback in that they are poor in both heat resistance and compression set. Furthermore, they usually have a high molecular weight, which causes high melt viscosities and low fluidity. Therefore, they also have a shortcoming in that it is difficult to mold them into complicated shapes or large-sized articles In contrast, the two-component-type elastomers show high fluidity right after the two components are mixed, and they can be readily molded into complicated shapes or large-sized articles. In addition, since they usually have a crosslinked structure, they are excellent in heat resistance and compression set. However, the viscosity of the mixture of the two components is increased due to a reaction between isocyanate groups and hydroxyl groups which proceeds in the system, and the mixture is finally gelled. There is therefore a limitation on the pot life of the mixture. Moreover, in order to obtain a reaction product which is satisfactorily uniform, it is necessary that the two components be used in stoichiometric amounts. It is therefore required to accurately weigh the two components and to thoroughly mix them to give a uniform mixture. On-the other hand, the one-component-moisture-curing-type elastomers are usually subjected to a process in which they are allowed to react with moisture in the air for curing. For this reason, the elastomers finally obtained have physical properties which are not so good as those of the two-component-type elastomers although their heat resistance is excellent. Since the component is reacted with moisture, the reaction proceeds slowly and requires a long time for complete curing. Furthermore, the thermosetting elastomers of the above two types contain free polyisocyanate monomers in their systems although the amount thereof is small, and the monomers may adversely affect the working environment depending on the conditions under which the elastomers are processed by molding. For this reason, it is often required to install a local exhaust system or the like.

Various proposals have been made in order to improve the above-described polyurethane elastomers. For instance, with respect to the two-component type elastomers, a method is proposed in which blocked isocyanate obtained by using a blocking agent and a polyol are made into a composition of an apparently one-component type. When the blocked isocyanate is heated to a temperature of 120° C. or higher, the blocking agent is dissociated and scattered to reproduce isocyanate groups. Although the storage stability can be improved by this method, some other problems are still unsolved, for example, the elastomer is foamed due to the blocking agent when cured; environmental pollution caused by the blocking agent splashed; and the elastomer has poor properties because of the blocking agent remaining therein. Such an elastomer is therefore partly used as a one-component-type paint system in the field of paints, but scarcely used in the field of elastomers. On the other hand, with respect to the one-component-moisture-curing-type elastomers, there are proposed a formulation which is not much affected by external conditions obtained, for example, by utilizing a water-absorbing composition or by adding a catalyst; and a composition of an apparently one-component type, composed of a curing agent which produces an amino group such as a ketimine or aldimine compound when reacted with moisture, and an isocyanate-terminated prepolymer system. However, an ideal one-component-type elastomer which is excellent in long-term storage stability, working properties, and elastomeric properties is not yet developed, and thus the development of such an elastomer is now strongly demanded.

Further, the development of compositions for polyurethane elastomers which do not contain free isocyanate monomers is also strongly demanded from the viewpoint of world-wide environmental problems.

It is noted that polyurethane resins obtained by using as one of the starting materials polyisocyanate having urethodione groups are known by the following patent publications: Japanese Patent Publication No. 46447/1982, Japanese Laid-Open Patent Publications Nos. 37022-1983 and 265970/1988, Japanese Patent Publication No. 50265/1989, Japanese Laid-Open Patent Publication No. 620/1990 and Japanese Patent Publication No. 16332/1990 and the like.

SUMMARY OF THE INVENTION

An object of the present invention is to provide a one-component-type composition for a polyurethane elastomer which meets the following requirements:

(1) have the characteristic properties of conventional polyurethane elastomers, such as rubber elasticity, chemical resistance, abrasion resistance, toughness, cold resistance and durability, which result from high cohesive energy, (2) have semipermanent storage stability comparable to that of thermoplastic polyurethane elastomers, (3) have excellent heat resistance and compression set due to a crosslinked structure which is formed by a curing reaction, (4) moldability by a conventional technique for processing thermoplastic resins, such as injection molding or extrusion molding, and (5) from the environmental point of view, avoid production or splashing of free polyisocyanate monomer upon handling, i.e., blending and heating; and to provide a method for processing the composition by molding.

Accordingly, the one aspect of the present invention, there is provided a one-component-type composition for a polyurethane elastomer, comprising as main component a polyurethane precursor containing a polyisocyanate component and a compound having active hydrogen groups, characterized in that the polyisocyanate component contains polyisocyanate having at least a urethodione group, that the compound having active hydrogen groups contains at least two active hydrogen groups in its molecule and has a molecular weight of 18 to 20000, that the polyurethane precursor is obtained by reacting the polyisocyanate component and the compound having active hydrogen groups under the condition that the equivalent ratio of the active hydrogen group in the compound having active hydrogen groups to the isocyanate group in the polyisocyanate component is in excess of 1.0, and that the equivalent ratio of the urethodione group to the active hydrogen group in the polyurethane precursor is from 0.25 to 1.0, and substantially no isocyanate group including a free polyisocyanate monomer exists in the one-component-type composition for the polyurethane elastomer. The second aspect of the invention is characterized in that the polyisocyanate component contains urethodione and isocyanurate groups which are derived from an isocyanate group. The third aspect of the invention is characterized in that the compound having active hydrogen groups are one or more compounds selected from water, polyols, polyamines having an amine group or the like, urea resins, melamine resins, epoxy resins, polyester resins, acrylic resins and polyvinyl alcohols. The fourth aspect of the invention is characterized in that a molecular weight of the compound having active hydrogen groups is 400 to 10000. The fifth aspect of the invention is characterized in that the equivalent ratio of the urethodione group to the active hydrogen group in the polyurethane precursor is from 0.35 to 0.75.

The sixth aspect of the invention is characterized in that the compound having active hydrogen groups is polyol, a molecular weight of the compound is 400 to 2000, the polyurethane precursor includes urethodione and isocyanurate groups, a urethodione group content in the polyurethane precursor is 2.0–6.0%, a isocyanurate group content in the polyurethane precursor is 2.0–3.5% and a hydroxy value of the polyurethane precursor is 20–65, and the equivalent ratio of the urethodione group to the active hydrogen group in the polyurethane precursor is from 0.45 to 0.60, and substantially no isocyanate group including a free polyisocyanate monomer exists in the one-component-type composition for the polyurethane elastomer.

The seventh aspect of the invention is characterized in that a compound having active hydrogen groups is further added to the polyurethane precursor to adjust the equivalent ratio of the urethodione group to the total of the active hydrogen group in the polyurethane precursor and the act ire hydrogen group in the further added compound to 0.25 to 1.0.

The eighth aspect of the invention provides a method for processing the one-component-type composition for a polyurethane elastomer by molding, characterized in that after the one-component-type composition for a polyurethane elastomer is injected into a mold and molded at a temperature lower than the temperature at which ring opening is caused in the urethodione group, a reaction is carried out to cure the composition by heating the composition to the temperature at which ring opening is caused in the urethodione group or higher; and the ninth aspect of the invention is characterized in that after the one-component-type composition for a polyurethane elastomer is heated to the temperature at which ring opening is caused in the urethodione group or higher, tile composition is injected into a mold and molded, and then a reaction is carried out to cure the composition.

Substantially no isocyanate group including a free polyisocyanate monomer exists in the one-component-type composition for a polyurethane elastomer of the present invention at room temperature, and a plurality of active isocyanate groups is reproduced by ring opening of the urethodione group which is caused when the composition is heated to a specific temperature or higher. For this reason, at a temperature lower than the specific one, there is no limitation on the pot life of the composition unlike a two-component-type composition for a polyurethane elastomer, and thus the composition has semipermanent storage stability. Further, the reproduced isocyanate groups are combined with ring-opened molecules contained in the polyurethane precursor at the end thereof, so that free polyisocyanate monomers are neither produced nor scattered. The handling of the composition of the present invention is therefore safe from the viewpoint of working environment.

Furthermore, the composition for a polyurethane elastomer of the present invention is of a one-component type, so that it is unnecessary to precisely weigh two components and to uniformly mix them like a two-component-type composition for a polyurethane elastomer. In addition, elongation and/or crosslinking of the chains in the composition is caused, just like a two-component-type composition for a polyurethane elastomer, due to a reaction between the reproduced isocyanate groups and the terminal active hydrogen groups, which takes place at the temperature at which ring opening is caused in the urethodione group or higher. The composition is thus cured, and a uniform reaction product can thus be obtained.

The one-component-type compositions for polyurethane elastomers according to the present invention are advantageous in that they have readiness upon handling equal to that of compositions for thermoplastic elastomers, and that they are excellent in pot life or storage stability and the like. The elastomers obtained from the compositions are fully imparted with elastomeric properties which are the advantageous properties of the conventional two-component-type polyurethane elastomers.

The compositions for polyurethane elastomers of the present invention are of a one-component type, have semipermanent storage stability, are cured when heated to the temperature at which ring opening is caused in the urethodione group to cause a reaction between the urethodione group and the act ire hydrogen group, and have excellent heat resistance and durability. Moreover, the rubber elasticity, chemical resistance, abrasion resistance, toughness, cold resistance and durability of the compositions can be controlled to a preferable range by properly selecting the skeletal structure thereof and the active hydrogen compound to be used.

Further, the compositions for polyurethane elastomers of the present invention do not contain, at room temperature, free polyisocyanate monomers which bring about an environmental problem. They are also free from generation of free polyisocyanate monomers, which is caused by some blocked isocyanates, even when they are cured at a high temperature. Therefore, they can be safely handled under good working environment.

Obviously, numerous modifications and variations of the present invention are possible in light of the above teachings. It is therefore to be understood that within the scope of the appended claims, the present invention may be practiced otherwise than as specifically described herein.

DETAILED DESCRIPTION OF THE INVENTION

The above-described "polyisocyanate component" contains a polyisocyanate having at least a urethodione group. In general, as long as the polyisocyanate component contains a urethodione group, the objects of the present invention can be attained. However, it may further contain a polyisocyanate having, in addition to the urethodione group, another group, such as an isocyanurate group, which is derived from an isocyanate group. Besides the above two groups, urethane, urea, carbodiimide, urethoneimine, oxazolidone and hydantoin groups are mentioned as groups which can be derived from an isocyanate group. These polyisocyanates can be used either singly or in combination of two or more. For instance, a mixture of polyisocyanate having a urethodione group and one having both urethodione and isocyanurate groups can he used. Further, if desired, one or more types of polyisocyanate monomers having two or more isocyanate groups in the molecule thereof can also be included as the polyisocyanate component. It is noted that this polyisocyanate monomer may be either one which is remaining as is without participating in a dimerization reaction which will be described later, or one which is properly added later in order to decrease the average number of the functional groups contained in the polyisocyanate component, thereby further suppressing the gelation which is caused when the polyurethane precursor is prepared by reacting the polyisocyanate component and the compound having active hydrogen groups.

The polyisocyanate which composes the above-described polyisocyanate component contains not only the polyisocyanate monomers but also polymeric compounds thereof. Examples of the polyisocyanate monomers include diisocyanates such as aromatic diisocyanates, for example, 2,4-tolylenediisocyanate (hereinafter referred to as TDI), 2,6-tolylenediisocyanate, xylene-1,4-diisocyanate, xylene-1,3-diisocynante, 4,4'-diphenylmethanediisocynante (hereinafter referred to as MDI), 4,4'-diphenyletherdiisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenyl-propanediisocyanate, m-phenylenediisocyanate, p-phenylene-diisocyanate, naphthylene-1,4-diisocyanate, naphthylene-1,5-diisocyanate and 3,3'-dimethoxydiphenyl-4,4'-diisocyanate; aliphatic diisocyanates, for example, tetramethylene-diisocyanate, hexamethylenediisocyanate (hereinafter referred to as HDI) and lysinediisocyanate; and alicyclic diisocyanates, for example, isophoronediisocyanate, hydrogenated tolylenediisocyanate, hydrogenated xylenediisocyanate, hydrogenated diphenylmethanediisocyanate and tetramethylxylenediisocyanate. In addition, those polyisocyanates which are obtained by polymerizing any of the above-enumerated diisocyanates, or by reacting a polyol having two or more functional groups with any of the above diisocyanates or a polymeric compound thereof can also be used.

In general, the polyisocyanate compound having a urethodione group, which is an essential component in the present invention, and the polyisocyanate compound having a urethodione group and another group such as an isocyanurate group, which can be used together with the above polyisocyanate compound, can be obtained by dimerization (producing urethodione) or trimerization (producing isocyanurate) of polyisocyanate monomers. Specifically, they can be prepared, for example, in the following manner They can be prepared in the presence of a catalyst for a urethodione-producing reaction, for example, a trialkylphosphine such as triethylphosphine, dibutylethylphosphine, tri-n-propylphosphine, triamylphosphine and tribenzylphosphine, or pyridine, usually at a reaction temperature of 0° C. to 90° C., in the absence of a solvent or in the presence of an inert solvent, for example, an aromatic solvent such as toluene or xylene, a ketone solvent such as methyl ethyl ketone or methyl isobutyl ketone, an ester solvent such as ethyl acetate or butyl acetate, or a glycol ether ester solvent such as propylene glycol methyl ether acetate or ethyl-3-ethoxypropionate. They can also be prepared, if necessary, in the presence of a plasticizer which is in a liquid state at the above reaction temperature, such as polyol or dioctylphthalate. This reaction is terminated by inactivating the catalyst for the urethodione-producing reaction by adding a solution of phosphoric acid, methyl paratoluenesulfonate, sulfur or the like to the reaction solution when from 20 to 50 mol % of the isocyanate groups are reacted. There is a case where a reaction product is precipitated as crystals in this reaction process depending on the type of the polyisocyanate used. Especially, aromatic polyisocyanates are readily crystallized, and separated from the reaction system. By such a method, a mixture of polyisocyanate having a urethodione group (that is, a dimer and a polyurethodione compound), polyisocyanate having both urethodione and isocyanurate groups, and, in some cases, another group, and polyisocyanate monomers, the starting material, is produced. This mixture can be used as the isocyanate component either as it is or after unreacted monomers are removed by means of membrane distillation or the like. In the above-described dimerization reaction, the higher the reaction temperature, and the lower the polyisocyanate monomer content at the time of termination of the reaction, the rate of the formation of the isocyanurate group becomes higher. In addition, the larger the amount of the catalyst such as trimethylphosphine, the rate of the formation of the urethodione group becomes higher. By controlling these reaction conditions, a polyisocyanate compound having urethodione and isocyanurate groups in a specific ratio can be obtained.

In the case where an isocyanurate group is contained, in addition to the urethodione group, in a specific proportion in the polyisocyanate component of the present invention, an elastomer of good quality, having heat resistance and compression set which are better than those of conventional polyurethane elastomers, and having low bleeding properties even at low hardness can he obtained.

Namely, in the one-component-type composition for a polyurethane elastomer of the present invention, when an isocyanurate group and/or another polymer is contained, in addition to the urethodione group, in a specific proportion in the polyisocyanate component, branching points can be introduced to a polyurethane precursor to such an extent that the polyurethane precursor is not gelled. For this reason, an elastomer having physical properties which are more excellent than those of elastomers obtained from conventional polyisocyanate having a urethodione group can he obtained in a shorter reaction time with a lower rate of reaction.

The above-described "compound having active hydrogen groups" is a compound containing at least two active hydrogen groups in the molecule, having a molecular weight of 18 to 20000.

Besides water, one or more compounds selected from polyols, polyamines having an amino group or the like, urea resins, melamine resins, epoxy resins, polyester resins, acrylic resins and polyvinyl alcohols can he used as the compound having active hydrogen groups. Further, when the compounds exept polyol are used, elastomer without urethane bonding may be prepared, but "the polyurethane elastomer composition" according to the present invention includes this compositin too.

Conventional polyols can be used as the polyol in the present invention. Since the isocyanate group contained in the polyisocyanate component has two or more functional groups, it is preferable to use a polyol having a small number of functional groups such as two functional groups in order to prevent the polyurethane precursor from being gelled when it is prepared. Examples of the polyol include polyester polyols, polyester amide polyols, polyether polyols, polyether-ester polyols and polycarbonate polyols.

Examples of the polyester polyols include polyester polyols and polyester amide polyols which can be obtained by dehydration condensation reaction between a dicarbonic acid such as succinic acid, adipic acid (hereinafter referred to as AA), sebacic acid, azelaic acid, terephthalic acid (hereinafter referred to as TP), isophthalic acid (hereinafter referred to as IP), hexahydroterephthalic acid or hexahydroisophthalic acid, or an acid ester or acid anhydride thereof, and a glycol such as an ethylene or propylene oxide addition product of ethylene glycol, 1,3-propylene glycol, 1,2-propylene glycol (hereinafter referred to as 1,2-PG), 1,4-butylene glycol (hereinafter referred to as 1,4-BG), 1,5-pentant glycol, 1,6-hexane glycol (hereinafter referred to as 1,6-HG), 3-methyl-1,5 -pentane glycol, neopentyl glycol, 1,8-octane glycol, 1,9-nonane diol, diethylene glycol, cyclohexane-1,4-diol, cyclohexane-1,4-dimethanol, dimer acid diol, trimethylolpropane (hereinafter referred to as TMP), glycerin, hexanetriol, N,N,N',N'-tetrakis(2-hydroxypropyl) ethylenediamine or bisphenol A, or a diamine, a triamine or aminoalcohol such as hexamethylenediamine, xylenediamine, isophoronediamine, monoethanolamine or isopropanoltriamine, or a mixture thereof. Further, a lactone polyester polyol which can be obtained by ring-opening polymerization of a cyclic ester (that is, lactone) monomer such as ε-caprolactone, alkyl-substituted ε-caprolactone, δ-valerolactone or alkyl-substituted δ-valerolactone can also be used as the polyester polyol.

Polyethylene glycol, polypropylene ether polyol, polytetramethylene ether polyol and the like can be mentioned as the polyether polyols. Those polyester polyols which can be prepared from any of the above polyether polyols and a dicarbonic acid or acid anhydride can be mentioned as the polyether-ester polyols.

The polycarbonate polyols can be obtained, for instance, by a reaction between hexane glycol, 3-methyl-1,5 -pentanediol or 1,4-cyclohexane dimethanol and diethyl or diphenyl carbonate. Commercially available polycarbonate polyols are, for example, "N-980" (Trademark) and "N-981" (Trademark) manufactured by Nippon Polyurethane Industry Co., Ltd. Further, an ethylene or propylene oxide addition product of a monomolecular diol or triol such as ethylene glycol, 1,3-propylene glycol, 1,2-PG, 1,4-BG, 1,5-pentane glycol, 1,6-HG, 3-methyl-1,5-pentane glycol, neopentyl glycol, 1,8-octane glycol, 1,9-nonane diol, diethylene glycol, cyclohexane-1,4-diol, cyclohexane-1,4-dimethanol, dimer acid diol, TMP, glycerin, hexanetriol, N,N,N',N'-tetrakis(2-hydroxypropyl)ethylenediamine or bisphenol A, which has been mentioned as the starting material of the polyester polyol, can also be used as the above-described polyol in the present invention.

Monomolecular diamines, triamines and aromatic diamines, and polyether polyamines containing a polyether which has an amine group as a terminal group can be mentioned as the polyamines having an amine group or the like.

Urea resins, melamine resins, epoxy resins, polyester resins, acrylic resins, polyvinyl alcohols anti the like can also be used as the whole of or a part of the compound having active hydrogen groups of the present invention as long as they have at least two active hydrogen groups.

It is preferred that the molecular weight of the above-enumerated compounds having active hydrogen groups be from 18 to 20000. In particular, water (molecular weight= 18) and those having a molecular weight of 400 to 10000 are preferred. When the molecular weight of the compound is in excess of 20000, the urethodione, isocyanurate or urethane group content is decreased, resulting in an elastomer having decreased toughness and cohesion. Further, when the molecular weight of the compound excluding water is less than 400, a brittle elastomer is obtained. It is necessary to properly select this molecular weight depending upon the use of an elastomer to be obtained. In order to enhance the heat resistance and the cohesive energy of the elastomer, it is preferable to use one having a low molecular weight. Further, When water is used as the compound having active hydrogen groups, the compound with urea bonding is prepared.

The above-described "polyurethane precursor" is obtained by reacting the above-described polyisocyanate component and compound having active hydrogen groups under the condition that the equivalent ratio of the active hydrogen group to the isocyanate group of 1.0, that is, the active hydrogen group is excessive. At the same time, the equivalent ratio of the urethodione group to the active hydrogen group in the precursor is in the range of 0.25 to 1.0, preferably 0.35 to 0.75. Since the active hydrogen group is excessive in this reaction system, substantially no isocyanate group remains in a polyurethane precursor obtained. A polyurethane precursor having active hydrogen groups can thus be obtained.

The above-described equivalent ratio of the urethodione group to the active hydrogen group is important. When this ratio is less than 0.25, the number of elongation and crosslinking of chains becomes small As a result, the polyurethane elastomer finally obtained has poor physical properties. On the other hand, if the above ratio is in excess of 1.0, a reaction mixture is readily gelled when the polyurethane precursor is prepared.

In order to make the equivalent ratio of the urethodione group to the active hydrogen group in the above range, it is necessary to properly select the average number of the functional groups of the polyisocyanate component in consideration of the isocyanurate group content and the like, the average number of the functional groups of the compound having active hydrogen groups in consideration of the introduction of a triol and the like, and the blend ratio of these compounds in consideration of the reactivity of the functional groups thereof, and to conduct a reaction at a temperature lower than the temperature at which ring opening is caused in the urethodione group. A precursor can thus he obtained without being gelled.

It is noted that in addition to the urethodione and active hydrogen groups, a group which is derived from an isocyanate group such as an isocyanurate, urethane, urea, carbodiimide, urethoneimine, oxazolidone or hydantoin group can also exist in the above precursor depending upon the polyisocyanate component used.

The preparation of the polyurethane precursor will now be explained in detail.

The polyurethane precursor can be prepared by uniformly mixing the above-described components in the above blend ratio and reacting them in a state of melt or bulk, or, if necessary, by the use of one or more inert solvents selected from, for example, aromatic hydrocarbon solvents such as toluene and xylene, ester solvents such as ethyl acetate and butyl acetate, ketone solvents such as methyl ethyl ketone and cyclohexanone, glycol ether ester solvents such as ethylene glycol ethyl ether acetate, propylene glycol methyl ether acetate and ethyl-3-ethoxypropionate, ether solvents such as tetrahydrofuran and dioxane, and polar solvents such as dimethylformamide, dimethylacetone, N-methylpyrrolidone and furfural, at a temperature at which ring opening is not caused in the urethodione group, preferably at 100° C. or lower (for example not more than 90° C., preferably 25° C. to 90° C.). The starting temperature of opening of the urethodione group of isocyanate dimer usualy about 100° C. In the case where any of the above solvents is used, the solvent and the like are separated and removed from the reaction system by means of membrane distillation after the reaction is completed, thereby obtaining a polyurethane precursor. Any apparatus can be used as a reactor as long as the above-described homogeneous reaction can be attained. For example, a reaction vessel equipped with a stirrer, a kneader, a mixing-kneading apparatus such as a single- or multi-screw extruder reactor, or the like can be used. Further, in order to increase the reaction rate, a metallic catalyst such as dibutyltindilaurate, or a tertiary amine catalyst such as triethylamine can also be used.

The ordinary state of the one-component-type composition for a polyurethane elastomer of the present invention may be liquid, solid or powder. In order to obtain an elastomer having improved functions, it is also possible to further add the above-described compound having active hydrogen groups to the polyurethane precursor, the main component, to adjust the equivalent ratio of the urethodione group to the total of the active hydrogen group in polyurethane precursor the and the active hydrogen group in further added compound the to 0.25 to 1.00, preferably to 0.35 to 0.75. Furthermore, a dissociation catalyst which lowers the ring-opening temperature of the urethodione group; an anti-gelling agent such as an agent for preventing an ester-urethane exchanging reaction, capable of protecting the composition from being gelled while it is preserved; and other agents such as an antioxidant, an ultraviolet light absorber, a hydrolysis-preventing agent, a colorant, a flame retarder, a viscosity modifier, a fluidity improver, a plasticizer, a thixotropic agent and a filler can also be incorporated into the composition. It is also possible to obtain a foamed elastomer by adding one or more foaming agents selected from pnuematogens such as methylene chloride, a fluorocarbon compound and pentane; organic foaming agents such as azobisisobutylonitrile, azodicarbonamide and N,N'-dinitroso-pentamethylenetetramine; and inorganic foaming agents such as sodium bicarbonate, ammonium carbonate and hydrogenated sodium borate to the composition for a polyurethane elastomer, and foaming the mixture by the froth method. It is noted that a foam stabilizer, silicone, an organic surfactant and the like can also be used, if necessary, to obtain the foamed elastomer.

A method for obtaining a polyurethane elastomer from the above composition can be selected depending on the shape of the final product and the conditions under which the composition is cured. For example, the following methods can be followed: a method in which after the composition for a polyurethane elastomer is injected into a mold by means of casting, extrusion molding, injection molding, blow molding, vacuum molding or compression molding, or coated onto a mold by spraying or application, a reaction is caused to cure the composition by application of thermal energy; or a method in which after thermal energy is applied to the composition, the composition is injected into a mold by any of the above-described molding methods, and then a reaction is carried out to cure the composition can be adopted. The above-mentioned reaction temperature is a temperature higher the temperature of ring opening of urethodione group and it is preferable that the reaction temperature is 160°–220° C. When the reaction temperature is less than 160° C., sufficient opening and reaction may not be carried out. When the reaction temperature is higher 220° C., the performance of the prepared elastomer falls greatly. Further, the starting temperature of opening of the urethodione group in a polymer with an urethodione group usualy about 160° C.

It is noted that in the case where the above-described equivalent ratio in the polyurethane precursor is in the range of 0.5 to 1.0 (0.5 being exclusive), the urethodione group is excessive. Therefore, elongation and/or crosslinking of the chains in the composition for a polyurethane elastomer according to the present invention can he caused by a reaction between the urethodione group and moisture contained in the air, or by an allophanate- or biuret-producing reaction between the urethodione group and a urethane group, a urea group or the like, or by homopolymerization of isocyanate group, producing, for example, carbodiimide or isocyanurate. It is unnecessary to cause ring opening in all of the urethodione groups as long as an elastomer having good physical properties can be obtained. Further, when the equivalent ratio is 0.25 or more, but less than 0.5, the active hydrogen group is excessive, so that the precursor behaves thermoplastically.

DESCRIPTION OF THE PREFERRED EMBODIMENTS

The present invention will now be explained more specifically by referring to the following examples.

Throughout the examples, "part(s)" and "%" mean "part(s) by weight" and "% by weight", respectively.

(1) Synthesis of Polyisocyanate Component having Urethodione Group

Intermediate Synthesis Example 1

In a reactor equipped with a stirrer, a thermometer and a condenser, 3000 parts of HDI (isocyanate group content= 49.9%, solid content=100%) and 6.0 parts of trioctylphosphine serving as a catalyst were charged. The mixture was heated to a temperature of 65° C. to 70° C. with stirring, and a reaction was conducted at the temperature for 6 hours. Subsequently, 3.5 parts of phosphoric acid was added to the reaction mixture to terminate the reaction, whereby a reaction product of which isocyanate group content was 31.0% was obtained as a pale-yellow solution.

It was confirmed by FT-IR (infrared absorption spectrum) and C13-NMR (nuclear magnetic resonance spectrum) that isocyanate, urethodione and isocyanurate groups were existing in the product obtained. The product was reacted with dibutylamine (hereinafter referred to as DBA) at the boiling point of polypropylene glycol methyl ether acetate (hereinafter referred to as PGM-Ac), a solvent having a high boiling point, and then subjected to back titration with an aqueous hydrochloric acid solution. The isocyanate group content thus determined was 38.6%. Therefore, the amount of the isocyanate group formed by dissociation of the urethodione group was 7.6%. The isocyanurate group content was 11.4%.

Intermediate Synthesis Example 2

In a reactor equipped with a stirrer, a thermometer and a condenser, 700 parts of TDI (isocyanate group content= 48.1%, solid content=100%) and 2300 parts of toluene were charged and mixed. Thereafter, 10.0 parts of tri-n-butylphosphine was added to the mixture as a catalyst at a temperature of 25° C. A reaction immediately took place. After approximately 5 minutes, a dimer began to precipitate at the bottom of the reactor. The temperature of the mixture was maintained at 50° C. to 65° C. with stirring, and a reaction was carried out at the temperature for 1.5 hours. Subsequently, 2.5 parts of phosphoric acid was added to the reaction mixture to terminate the reaction, whereby a reaction product of which isocyanate group content was 15.0% was obtained as a pale-yellow solution. This solution was subjected to simple distillation, followed by membrane distillation conducted at 120° C. and 0.01 Torr, thereby removing the toluene and unreacted TDI from the solution.

The isocyanate group content of the product was 14.8%. It was confirmed by FT-IR and C13-NMR that isocyanate, urethodione and isocyanurate groups were existing in the product. The product was reacted with DBA at the boiling point of PGM-Ac, and then subjected to back titration with an aqueous hydrochloric acid solution. The isocyanate group content thus determined was 36.1%. Therefore, the amount of the isocyanate group formed by the dissociation of the urethodione group was 21.3%. The isocyanurate group content was 11.9%.

Intermediate Synthesis Example 3

In a reactor equipped with a stirrer, a thermometer and a condenser, 3000 parts of HDI (isocyanate group content= 49.9%, solid content=100%) and 45 parts of 1,2-PG were charged, and a reaction was carried out at a temperature of 60° C. for two hours with stirring. The amount of the isocyanate group became 47.6%. Subsequently, 6.5 parts of trioctylphosphine was charged into the reaction mixture as a catalyst, and a reaction was carried out at a temperature of 50° C. to 55° C. for 8 hours. 1.9 parts of phosphoric acid was then added to the mixture to terminate the reaction, whereby a reaction product of which isocyanate group content was 40.2% was obtained as a pale-yellow solution. Unreacted HDI was removed from this solution by membrane distillation conducted at 120° C. and 0.01 Torr.

The isocyanate group content of the product was 21.6%. It was confirmed by FT-IR and C13-NMR that isocyanate, urethodione, isocyanurate and urethane groups were existing in the product. This product was reacted with DBA at the boiling point of PGM-Ac, and then subjected to back titration with an aqueous hydrochloric acid solution. The isocyanate group content thus determined was 38.5%. Therefore, the amount of the isocyanate group formed by the dissociation of the urethodione group was 16.9%. The isocyanurate group content was 8.4%, and the urethane group content was 1.6%.

(2) Synthesis Examples of Polyurethane Precursor

Synthesis Example 1

In a reactor equipped with a stirrer, a thermometer and a condenser, 100 parts of the polyisocyanate synthesized in Intermediate Synthesis Example 1, 246 parts of an aromatic polyester diol (molecular weight=1000), and 18 parts of 1,4-butanediol (molecular weight=90) were charged, and a reaction was carried out at a temperature of 80° C. for 5 hours.

The reaction product was subjected to FT-IR analysis. As a result, it was found that the absorptions of the urethodione and isocyanurate groups were unchanged from the outset of the reaction. Further, the disappearance of the absorption of the isocyanate group was found, and the completion of the urethanization was thus confirmed.

The reaction product, a polyurethane precursor, was a solid in a wax-like state at room temperature (23°–25° C.). Free polyisocyanate monomers were not detected in the reaction product. The urethodione group content of the reaction product was 2.1%, the hydroxyl value was 22.8, and the equivalent ratio of the urethodione group to the active hydrogen group was 0.52.

Synthesis Example 2

In a reactor equipped with a stirrer, a thermometer and a condenser, 100 parts of the polyisocyanate synthesized in Intermediate Synthesis Example 2, 249 parts of polybutylene adipate diol (molecular weight=1000), and 20 parts of cyclohexanediol were charged, and a reaction was carried out at a temperature of 80° C. for 5 hours.

The reaction product was subjected to FT-IR analysis. The results obtained were the same as those obtained in Synthesis Example 1, that is, the absorptions of the urethodione and isocyanurate groups were unchanged from the outset of the reaction, and the absorption of the isocyanate group disappeared, showing the completion of the urethanization.

The reaction product, a polyurethane precursor, was solid in a wax-like state at room temperature (23°–25° C.). Free polyisocyanate monomers were not detected in the reaction product. The urethodione group content of the reaction product was 5.7%, the hydroxyl value was 64.2, and the equivalent ratio of the urethodione group to the active hydrogen group was 0.55.

Synthesis Example 3

In a reactor equipped with a stirrer, a thermometer and a condenser, 100 parts of the polyisocyanate synthesized in Intermediate Synthesis Example 3, 14 parts of IPDI (isocyanate group content=37.8%, solid content=100%), and 241 parts of 3-methyl-1,5-pentane adipate diol (molecular weight=500) were charged, and a reaction was carried out at a temperature of 80° C. for 5 hours. As the reaction proceeded, the viscosity of the mixture was increased, but the mixture remained in a liquid state.

The reaction product was subjected to FT-IR analysis. The results obtained were the same as those obtained in Synthesis Example 1, that is, the absorptions of the urethodione and isocyanurate groups were unchanged from the outset of the reaction, and the absorption of the isocyanate group disappeared, showing the completion of the urethanization. Subsequently, 6.4 parts of TMP was added, and the mixture was stirred to obtain a homogeneous solution.

The reaction product, a polyurethane precursor, was a liquid having a high viscosity at room temperature (23°–25° C.). Free polyisocyanate monomers were not detected in the reaction product. The urethodione group content of the reaction product was 4.7%, the hydroxyl value was 62.3, and the equivalent ratio of the urethodione group to the active hydrogen group was 0.50. The viscosity of the product measured by a Brookfield type viscometer at 100° C. was 20000 cp.

(3) Preparation of Composition for Polyurethane Elastomer

Examples 1–3 and Comparative Examples 1 to 4

0.5 parts of an antioxidant ("Irganox 1010" (Trademark) manufactured by Ciba-Geigy, Ltd.) was added to each of the polyurethane precursors obtained in Synthesis Examples 1–3. The compositions for polyurethane elastomers thus obtained are referred to as the compositions of Examples 1, 2 and 3, respectively.

On the other hand, 0.5 parts of the above antioxidant was added to each of the following commercially available products (Comparative Products 1–4). The compositions thus obtained are referred to as the compositions of Comparative Examples 1, 2, 3 and 4.

Comparative Product 1: The two-component-type composition used in the below-described Comparative Production Example 1

Comparative Product 2: The two-component-type composition use in the below-described Comparative Production Example 2

Comparative product 3: The two-component-type composition used in the below-described Comparative Production Example 3

Comparative Product 4: The thermoplastic elastomer used in the below-described Comparative Production Example 4

(4) Preparation of Elastomer

Elastomers were prepared in the following manner, by using the above compositions of Examples 1 to 3 and Comparative Examples 1 to 4.

Production Examples 1 to 3

Each of the compositions of Examples 1 to 3 was compression-molded and cured at 200° C. for 15 minutes by a labo-press, thereby obtaining an elastomer sheet having a thickness of approximately 1 mm.

Comparative Production Example 1

(The Composition of Comparative Example 1 obtained by using the above Comparative Product 1 was used.)

100 parts of a TDI-polyester isocyanate-terminated prepolymer (isocyanate group content=4.2%, viscosity=1600 cSt/75° C.) was heated to 80° C. To this was added 10.7 parts of 3,3'-dichloro-4,4'-dianainodiphenylmethane (hereinafter referred to as MOCA) which had been heated to 120° C., and these compounds were thoroughly mixed. The mixture was injected into a mold, and then cured at 120 ° C. for 6 hours, thereby obtaining an elastomer sheet having a thickness of 2 mm.

Comparative Production Example 2

(The Composition of Comparative Example 2 obtained by using the above Comparative Product 2 was used.)

100 parts of a TDI-polyester isocyanate-terminated prepolymer (isocyanate group content=3.8%, viscosity=1400 cSt/75° C.) was heated to 80° C. To this was added 11.2 parts of MOCA which had been heated to 120° C., and these compounds were thoroughly mixed. The mixture was injected into a mold and then cured at 120° C. for 10 hours, thereby obtaining an elastomer sheet having a thickness of 2 mm.

Comparative Production Example 3

(The Composition of Comparative Example 3 obtained by using the above Comparative Product 3 was used.)

100 parts of a TDI-polyester isocyanate-terminated prepolymer (isocyanate group content=6.2%, viscosity=1600 cSt/75° C.) was heated to 80° C. To this was added 6.3 parts of 1,4-butanediol, and these compounds were thoroughly mixed. The mixture was injected into a mold, and then cured at 120° C. for 10 hours, thereby obtaining an elastomer sheet having a thickness of 2mm.

Comparative Production Example 4

(The Composition of Comparative Example 4 obtained by using the above Comparative Product 4 was used.)

An elastomer sheet having a thickness of 2 mm was obtained by subjecting polyester TPU to injection molding.

(5) Evaluation of Properties of Compositions for Polyurethane Elastomers and Elastomers Obtained (a) Stability of Compositions for Polyurethane Elastomers From the increase with the passage of time in the viscosity of the composition which was preserved at 100° C., the stability of the composition was evaluated in accordance with the following standard.

<Standard for Evaluation> x: Gelled within one day o: Stable for 21 days or more (b) Working Environment

Under the same conditions, ambient air was sampled when the composition was prepared and also when it was processed by molding, and then subjected to gas chromatography. Presence or absence of free polyisocyanate monomers scattered in the ambient air was evaluated.

(c) Physical Properties

The hardness, tensile strength, breaking extension, tearing strength and 50% compression set (at 70° C., after heated for 22 hours) were measured in accordance with JIS K 6301.

The heat resistance (at 120° C., after heated for 30 days, evaluated by the rate of retention of the tensile strength) was determined in accordance with JIS K 6723.

The properties of the compositions for polyurethane elastomers of Examples 1 to 3 and Comparative Examples 1 to 4 are shown in Table 1. The physical properties of the polyurethane elastomers obtained in Production Examples 1 to 3 and Comparative Production Examples 1 to 4 are shown in Table 2.

Demonstrated by the results shown in Tables 1 and 2 are as follows: No increase in the viscosity was found in the compositions for polyurethane elastomers of the present invention not only at 25° C. but also at a considerably high temperature of 50° C. They are thus proved to be extremely excellent in storage stability. Further, no free polyisocyanate monomer was detected when the compositions were prepared and also when they were cured. It is thus found that the compositions of the invention are excellent also from the viewpoint of working environment. The physical properties of the elastomers obtained from the compositions of the invention are equal to those of the elastomers obtained from the conventional two-component-type compositions. In summary, the elastomers of the present invention have excellent stability, are excellent from the viewpoint of working environment, and, at the same, have excellent physical properties. On the contrary, the two-component-type compositions of Comparative Examples 1 to 3 are very poor in stability although their physical properties are excellent. In addition, isocyanate monomers were detected when the compositions were prepared and also when they were cured. It is thus found that these compositions are poor when working environment is taken into consideration. Moreover, the composition for a thermoplastic elastomer of Comparative Example 4 is poor in physical properties such as tensile strength and compression set although it is excellent from the viewpoints of stability and working environment.

It is noted that the present invention is not limited to the above embodiments, and that the invention may be embodied in other various forms depending upon the purpose and the intended use without departing from the scope thereof.

What is claimed is:

1. A one-component composition for a polyurethane elastomer, comprising as a main component a polyurethane precursor containing a polyisocyanate component and a compound having active hydrogen groups,

TABLE 1

| Examples and Comparative Examples | Ex. 1 | Ex. 2 | Ex. 3 | Compara. Ex. 1 | Compara. Ex. 2 | Compara. Ex. 3 | Compara. Ex. 4 |
|---|---|---|---|---|---|---|---|
| Stability: 25° C. | O | O | O | X | X | X | O |
| 50° C. | O | O | O | X | X | X | O |
| Detection of free polyisocyanate monomers (Urethane resin composition: when blended) | Not detected | Not detected | Not detected | 0.38 ppm | 0.32 ppm | 0.18 ppm | Not detected |
| Detection of free polyisocyanate monomers (Urethane resin composition: when cured) | Not detected | Not detected | Not detected | 0.18 ppm | 0.15 ppm | 0.05 ppm | Not detected |

TABLE 2

| Production Examples and Comparative Production Examples | Produc. Ex. 1 | Produc. Ex. 2 | Produc. Ex. 3 | Compara. Produc. Ex. 1 | Compara. Produc. Ex. 2 | Compara. Produc. Ex. 3 | Compara. Produc. Ex. 4 |
|---|---|---|---|---|---|---|---|
| Hardness (JIS A) | 97 | 89 | 80 | 90 | 85 | 85 | 80 |
| Tensile strength (Kg/cm$^2$) | 321 | 534 | 410 | 510 | 510 | 500 | 350 |
| Breaking extension (%) | 310 | 620 | 430 | 570 | 640 | 600 | 570 |
| Tearing strength (Kg/cm) | 138 | 77 | 53 | 93 | 85 | 95 | 93 |
| 50% Compression set (%) (70° C., 22 hours) | 36 | 35 | 26 | 27 | 34 | 37 | 56 |
| Heat resistance (retention rate of tensile strength after heated at 120° C. for 30 days) | 95 | 97 | 97 | 92 | 93 | 97 | 87 | in which said polyisocyanate component contains a polyisocyanate having at least one urethodione group, said compound having active hydrogen groups contains at least two active hydrogen groups in its molecule and has a molecular weight of 18 to 20000, said polyurethane precursor is obtained by reacting said polyisocyanate component and said compound having active hydrogen groups under conditions where the equivalent ratio of an active hydrogen group in said compound having active hydrogen groups to an isocyanate group in said polyisocyanate component exceeds 1.0, and where the equivalent ratio of said urethodione group to said active hydrogen group in the polyurethane precursor is from 0.25 to 1.0, and substantially no isocyanate group including a free polyisocyanate monomer exists in said one-component composition, wherein said composition is used for molding processing.

2. A one-component composition for a polyurethane elastomer as defined in claim 1, wherein said polyisocyanate component comprises urethodione and isocyanurate groups which are derived from said isocyanate group.

3. A one-component composition for a polyurethane elastomer as defined in claim 1 or 2, wherein said compound having active hydrogen groups are one or more compounds selected from water, polyols, polyamines having an amino group, urea resins, melamine resins, epoxy resins, polyester resins, acrylic resins and polyvinyl alcohols.

4. A one-component composition for a polyurethane elastomer as defined in claim 1 or 2, wherein the molecular weight of said compound having active hydrogen groups is 400 to 10000.

5. A one-component composition for a polyurethane elastomer as defined in claim 1 or 2, wherein said equivalent ratio of said urethodione group to said active hydrogen group in said polyurethane precursor is from 0.35 to 0.75.

6. A one-component composition for a polyurethane elastomer as defined in claim 1, wherein said compound having active hydrogen groups is polyol, the molecular weight of said compound is 400 to 2000, said polyurethane precursor includes urethodione and isocyanurate groups, the urethodione group content in said polyurethane precursor is 2.0–6.0%, the isocyanurate group content in said polyurethane precursor is 2.0–3.5% and the hydroxy value of said polyurethane precursor is 20–65, and said equivalent ratio of said urethodione group to said active hydrogen group in said polyurethane precursor is from 0.45 to 0.60, and substantially no isocyanate group including a free polyisocyanate monomer exists in said one-component composition for said polyurethane elastomer.

7. A one-component composition for a polyurethane elastomer as defined in claim 1 or 2, where in a compound having active hydrogen groups is further added to said polyurethane precursor to adjust said equivalent ratio of said urethodione group to a total of said active hydrogen group in said polyurethane precursor and said active hydrogen group in said further added compound to 0.25 to 1.0.

8. A one-component composition for a polyurethane elastomer as defined in claim 7, wherein said further added compound having active hydrogen groups are one or more compounds selected from polyols, polyamines having an amino group, urea resins, melamine resins, epoxy resins, polyester resins, acrylic resins and polyvinyl alcohols.

9. A method for processing a one-component composition for a polyurethane elastomer by molding, which comprises the steps of:

injecting said one-component composition for said polyurethane elastomer which includes as a main component a polyurethane precursor composing a polyisocyanate component and a compound having active hydrogen groups, in which said polyisocyanate component contains a polyisocyanate having at least a urethodione group, said compound having active hydrogen groups contains at least two active hydrogen groups in its molecule and has a molecular weight of 18 to 20000, said polyurethane precursor is obtained by reacting said polyisocyanate component and said compound having active hydrogen groups under a condition that an equivalent ratio of said active hydrogen group in said compound having active hydrogen groups to an isocyanate group in said polyisocyanate component exceeds 1.0, and an equivalent ratio of said urethodione group to said active hydrogen group in said polyurethane precursor is from 0.25 to 1.0, and substantially no isocyanate group including a free polyisocyanate monomer exists in said one-component composition for said polyurethane elastomer, into a mold, and molding said composition at a temperature lower than a temperature at which ring opening is caused in said urethodione group; and heating said composition to a temperature at which ring opening is caused in said urethodione group or higher for inducing a reaction to cure.

10. A method for processing a one-component composition for a polyurethane elastomer as defined in claim 9, wherein said polyisocyanate component comprises urethodione and isocyanurate groups which are derived from said isocyanate group.

11. A method for processing a one-component composition for a polyurethane elastomer as defined in claim 9 or 10, wherein said compound having active hydrogen groups are one or more compounds selected from water, polyols, polyamines having an amino group, urea resins, melamine resins, epoxy resins, polyester resins, acrylic resins and polyvinyl alcohols.

12. A method for processing a one-component composition for a polyurethane elastomer as defined in claim 9, wherein a compound having active hydrogen groups is further added to said polyurethane precursor to adjust an equivalent ratio of said urethodione group to a total of said active hydrogen group in said polyurethane precursor and an active hydrogen group in said further added compound to 0.25 to 1.0.

13. A method for processing a one-component composition for a polyurethane elastomer as defined in claim 12, wherein said further added compound having active hydrogen groups are one or more compounds selected from polyols, polyamines having an amino group, urea resins, melamine resins, epoxy resins, polyester resins, acrylic resins and polyvinyl alcohols.

14. A method for processing a one-component composition for a polyurethane elastomer as defined in claim 9 or 12, wherein said temperature lower than said temperature at which ring opening is caused in said urethodione group is 60°–90° C., and said temperature higher than said temperature at which ring opening is caused is 160°–220° C.

15. A method for processing a one-component composition for a polyurethane elastomer by molding, which comprises the steps of:

heating said one-component composition for a polyurethane elastomer which includes as a main component a polyurethane precursor composing a polyisocyanate component and a compound having active hydrogen groups, in which said polyisocyanate component contains a polyisocyanate having at least a urethodione group, said compound having active hydrogen groups contains at least two active hydrogen groups in its molecule and has a molecular weight of 18 to 20000, said polyurethane precursor is obtained by reacting said polyisocyanate component and said compound having active hydrogen groups under a condition that an equivalent ratio of said active hydrogen group in said compound having active hydrogen groups to said isocyanate group in said polyisocyanate component exceeds 1.0, and an equivalent ratio of said urethodione group to said active hydrogen group in said polyurethane precursor is from 0.25 to 1.0, and substantially no isocyanate group including a free polyisocyanate monomer exists in said one-component composition for said polyurethane elastomer at a temperature which ring opening is caused in said urethodione group or higher;

injecting said composition into a mold for molding; and curing said composition.

16. A method for processing a one-component composition for a polyurethane elastomer as defined in claim 15, wherein said polyisocyanate component comprises urethodione and isocyanurate groups which are derived from said isocyanate group.

17. A method for processing a one-component composition for a polyurethane elastomer as defined in claim 15 or 16, wherein said compound having active hydrogen groups are one or more compounds selected from water, polyols, polyamines having an amino group, urea resins, melamine resins, epoxy resins, polyester resins, acrylic resins and polyvinyl alcohols.

18. A method for processing a one-component composition for a polyurethane elastomer as defined in claim 15, wherein a compound having active hydrogen groups is further added to said polyurethane precursor to adjust said equivalent ratio of said urethodione group to a total of said active hydrogen group in said polyurethane precursor and an active hydrogen group in said further added compound to 0.25 to 1.0.

19. A method for processing a one-component composition for a polyurethane elastomer as defined in claim 18, wherein said further added compound having active hydrogen groups are one or more compounds selected from polyols, polyamines having an amino group, urea resins, melamine resins, epoxy resins, polyester resins, acrylic resins and polyvinyl alcohols.

20. A method for processing a one-component composition for a polyurethane elastomer as defined in claim 15 or 18, wherein said temperature higher than said temperature at which ring opening is caused in said urethodione group is 160°–220° C.

21. A one-component composition for a polyurethane elastomer, comprising as a main component a polyurethane precursor containing a polyisocyanate component and a compound having active hydrogen groups, wherein said polyisocyanate component contains a polyisocyanate having at least one urethodione group, at least one isocyanurate group derived from an isocyanate group of said polyisocyanate, and at least one isocyanate group formed by dissociation of said urethodione group, wherein said compound having active hydrogen groups contains at least two active hydrogen groups in its molecule and has a molecular weight of 18 to 20000, wherein said polyurethane precursor is obtained by reacting said polyisocyanate component and said compound having active hydrogen groups under conditions where
the equivalent ratio of an active hydrogen group in said compound having active hydrogen groups to an isocyanate group in said polyisocyanate component exceeds 1.0,
the equivalent ratio of said urethodione group to said active hydrogen group in the polyurethane precursor is from 0.25 to 1.0, and
the weight ratio of said isocyanurate group to said isocyanate group formed by dissociation of said urethodione group is 0.5 to 1.45, and substantially no isocyanate group including a free polyisocyanate monomer exists in said one-component composition, wherein said composition is used for molding processing.

* * * * *